United States Patent [19]
Hoyer et al.

[11] 3,789,061
[45] Jan. 29, 1974

[54] FUNGICIDAL AND FUNGISTATIC THIOCARBONATES

[75] Inventors: Georg-Alexander Hoyer; Ernst Albrecht Pieroh, both of Berlin, Germany

[73] Assignee: Schering AG., Berlin and Bergkamen, Germany

[22] Filed: Mar. 31, 1970

[21] Appl. No.: 24,375

[30] Foreign Application Priority Data
Apr. 24, 1969 Germany............................ 1921988

[52] U.S. Cl........... 260/455 B, 260/347.5, 424/285, 424/301
[51] Int. Cl........................................ C07c 154/00
[58] Field of Search....... 260/455 B, 347.5; 424/301

[56] References Cited
UNITED STATES PATENTS

| | | | |
|---|---|---|---|
| 3,264,337 | 8/1966 | Louthan | 260/455 B |
| 2,840,502 | 6/1958 | Lambrech | 260/455 B |
| 3,318,936 | 5/1967 | Sakai et al. | 260/455 B |
| 3,203,996 | 8/1965 | Moore | 424/301 |
| 3,234,260 | 2/1966 | Pianka et al. | 424/301 |
| 2,369,150 | 2/1945 | Lincoln et al. | 260/455 B |
| 3,093,537 | 6/1963 | Tilles | 260/455 B |

OTHER PUBLICATIONS

Hoyer et al. "Fungicidal Alkyl N-(dimethylaminoalkyl) Carbamates and Thiocarbamates," (1968), CA71, No. 60112P (1969).

*Primary Examiner*—Glennon H. Hollrah
*Attorney, Agent, or Firm*—Joseph F. Padlon

[57] ABSTRACT

Novel thiocarbonates of the formula $$(CH_3)_2 N-(CH_2)_3-O-CO-S-R$$

wherein R is the radical of an aliphatic hydrocarbon, and their salts with inorganic or organic acids are provided having fungicidal and fungistatic effects and the method of making the same.

1 Claim, No Drawings

FUNGICIDAL AND FUNGISTATIC THIOCARBONATES

The invention relates to novel thiocarbonates having fungicidal and fungistatic effects, to the use of the compounds as fungicidal and fungistatic agents, and to methods of preparing the same.

Among the known active agents having fungicidal effects are tetramethylthiuram disulfide, N-trichloromethylthio-4-cyclohexene-1,2-dicarboximide, and 5-ethoxy-3-trichloromethyl-1,2,4-thiadiazole.

Fungicidal and fungistatic N-dialkylaminoalkyl carbaminic acid esters and corresponding thiocarbaminic acid esters have been described in Belgian Pat. No. 708,057.

It has now been found that compounds of the formula

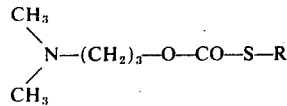

wherein R is the radical of an aliphatic hydrocarbon, and their salts with inorganic or organic acids have fungicidal and fungistatic effects which are surprisingly greater than those of known compounds employed for similar purposes.

The invention therefore relates to new compounds of the above formula, to their use as fungicidal and fungistatic agents, and to methods of preparing the compounds.

The compounds of the invention are particularly effective against fungi causing "damping-off" disease which are very difficult to control, such as *Pythium ultimum*. Another advantage is the excellent tolerance by plants to the use of these compounds.

They may therefore be employed, for example, in agriculture and in horiculture as seed disinfectants or for general soil treatment for their fungicidal and fungistatic effects on the soil.

The novel compounds may be employed alone or in mixtures of several active agents. Furthermore and optionally, other fungicides, nematocides, herbicides, seed disinfectants or other parasite control agents may be added, depending on the desired purpose. The compounds are preferably used in the form of compositions, such as powders, spreadable compositions, granulates, solutions, emulsions or suspensions, with added liquid and/or solid carriers or diluents, and optionally with wetting, adhesion improving, emulsifying and/or dispersing agents.

Suitable liquid carriers are water, mineral oils or other organic solvents such as xylene, chlorobenzene, cyclohexanol, cyclohexanone, dioxan, acetonitrile, ethyl acetate, dimethylformamide and dimethylsulfoxide, and others.

Solid carriers which are suitable include limestone, kaolin, chalk, talcum, attaclay and other clays as well as natural or synthetic silica.

As surfactants, there may be mentioned the salts of lignosulfonic acids, salts of alkylated benzenesulfonic acids, sulfonated acid amides and their salts, polyethoxylated amines and alcohols.

When the active agents of the invention are to be used for seed treatment, dyes such as neofuchsine and others may be admixed in order to impart a clearly visible color to the treated seeds.

The proportion of the active agent or agents in the compositions may vary within limits, the actual concentration of the active agent in the composition being determined mainly by the rate at which the composition is intended to be used for soil or seed treatment. By way of example, the compositions may contain between about 1 and 80 percent by weight of the active agent and about 99 to 20 percent of liquid or solid carrier and optionally up to 20 percent surfactants in the form of an emulsion or of a solid composition.

The novel compounds are prepared, for example, by reacting gamma-dimethylaminopropanol of the formula $(CH_3)_2=N-(CH_2)_3-OH$ with a compound of the formula $R-S-CO-Hal$ wherein R is the radical of an aliphatic hydrocarbon and Hal is halogen, preferably chlorine, in the presence of an acid acceptor, optionally followed by treatment with an inorganic or organic acid.

Suitable acid acceptors are, for example, tertiary organic amines, such as triethylamine or pyridine and others, inorganic bases, such as alkali metal hydroxide or carbonate and others, or the gamma-dimethylaminopropanol employed as a reactant which is then used in a correspondingly greater amount.

The reaction is preferably carried out with the use of an inert solvent, for example, an ether or a liquid hydrocarbon and the like, either as a single-phase or a two-phase reaction, the latter with the addition of non-miscible liquids, for example, water and an organic liquid not miscible with the same.

The reaction proceeds preferably in the temperature range of about 0° to 100°C, but it can be carried out also at higher and lower temperatures.

The salts may be prepared by the action of an organic or inorganic acid on the thiocarbonate. As suitable acids, any inorganic or organic acid, such as mineral acids, mono- or polycarboxylic acids and sulfonic acids may be considered of which the following are mentioned: hydrochloric acid, sulfuric acid, formic acid, propionic acid, valeric acid, oxalic acid, malonic acid, succinic acid, cyanoacetic acid, chloracetic acid, dichloracetic acid, trifluoracetic acid, benzoic acid, furan-2-carboxylic acid, p-toluenesulfonic acid, methanesulfonic acid, thioglycolic acid, citric acid, and the like. Optionally, solvents such as water, ethers, alcohols or liquid hydrocarbons may be employed. The reaction temperature is not critical. After the reaction, the salts formed are recovered in a manner known in the art, for example, by suction filtration.

The salts may also be prepared advantageously in a single stage process in which gamma-dimethylaminopropanol is reacted with chlorothioformic acid esters with or without solvent at about −20° to 100°C, wherein the aminoalcohol derivative itself acts as an acid captor.

The preparation of the compounds of the invention is described hereinbelow in more detail, and is illustrative of the invention.

a. Preparation of the thiocarbonates 0.1 Mole of a chlorothioformic acid ester is added slowly drop by drop to a solution of 0.1 mole gamma-dimethylaminopropanol and 0.1 mole triethylamine in 200 ml ether with constant stirring. Stirring is continued for several hours, the reaction mixture is then left to stand overnight, whereupon the precipitated triethylamine hydrochloride is filtered off with suction, the filtrate is then evaporated, and the residue is fractionated in a vacuum. The yield is between 70 and 80 percent of theory.

b. Preparation of the salts 0.063 Mole O-gamma-dimethylaminopropyl-S-alkyl thiocarbonate is dissolved in 150 ml of absolute ether. HCl gas is then introduced with stirring and cooling until no further precipitation occurs. The precipitate is recovered by suction filtration and dried over phosphorus pentoxide. The yields are between 80 and 90 percent of theory.

According to another method, 0.15 mole chlorothioformic acid ester is dissolved in 200 ml of absolute ether. 0.15 Mole gamma-dimethylaminopropanol in 200 ml of absolute ether is added slowly dropwise with stirring at 30°–36°C. Stirring is continued for 2 hours and the resultant precipitate is filtered off with suction and dried over phosphorus pentoxide. The yields are between 85 and 95 percent of theory.

The following compounds are representative of the invention:

The free bases are soluble or very soluble in organic solvents such as ether, ethanol, acetone, benzene, chloroform, acetonitrile, ethyl acetate, dimethylformamide, dimethylsulfoxide, pyridine and the like, whereas the salts dissolve well or very well in water, methanol, ethanol and chloroform.

The following examples illustrate the fungicidal and fungistatic effects of the compounds of the invention.

EXAMPLE 1

Sterilized compost soil was inoculated with mycelium of *Pythium ultimum*. Peas of the strain "Wonder of Kelvedon," treated with suitable compositions of the active agents to be tested were seeded in clay dishes having a soil capacity of 2 liters at a depth of 2 to 3 cm, at 50 seeds per concentration. After a cultivation period of 14 days at a temperature of 22–25°C, the number of germinated peas in percent was determined. Known active agents were used as controls. The compositions employed were powders containing 50 percent by weight of the active agent.

|  | Number of germinated peas, per cent | |
|---|---|---|
|  | 1.0 g. active agent per kg seeds | 2.0 g active agent per kg seeds |
| O-γ-Dimethylaminopropyl-S-propyl thiocarbonate | 82% | 88% |
| O-γ-Dimethylaminopropyl-S-propyl thiocarbonate hydrochloride | 90% | 94% |
| O-γ-Dimethylaminopropyl-S-ethyl thiocarbonate hydrochloride | 70% | 94% |
| O-γ-Dimethylaminopropyl-S-ethyl thiocarbonate | 80% | 96% |
| Controls |  |  |
| Tetramethylthiuram disulfide | 32% | 40% |
| N-Trichloromethylthio-4-cyclohexene-1,2-dicarboximide | 54% | 80% |
| 5-Ethoxy-3-trichloromethyl-1,2,4-thiadiazole | 52% | 82% |
| N-γ-Dimethylaminopropyl-carbaminic acid ethyl ester | 42% | 72% |
| Nγ-Dimethylaminopropyl-carbaminic acid propyl ester | 76% | 86% |
| Steamed soil, untreated seeds | 98% | 96% |
| Infested soil, untreated seeds | 0% | 0% |

| | Physical Constants | |
|---|---|---|
| 1. O-gamma-dimethylaminopropyl-S-ethyl thiocarbonate | $n_D^{20}$ | 1.4640 |
| | B.P.$_{15}$ | 110–112°C |
| 2. O-gamma-dimethylaminopropyl-S-propyl thiocarbonate | $n_D^{20}$ | 1.4655 |
| | B.P.$_{17}$ | 123–124°C |
| 3. O-gamma-dimethylaminopropyl-S-ethyl thiocarbonate hydrochloride | M.P. | 165–167°C (decomp.) |
| 4. O-gamma-dimethylaminopropyl-S-propyl thiocarbonate hydrochloride | M.P. | 128–130°C |

EXAMPLE 2

Steamed compost soil was inoculated with mycelium of *Pythium ultimum*. Peas of the strain Wonder of Kelvedon, treated with compositions containing 10 percent active agents, were seeded in clay dishes holding 2 liters of soil at a depth of 2 to 3 cm, at 50 seeds per concentration. After a cultivation time of 14 days at a temperature of 22–25°C, the number of germinated peas was determined in per cent. Known active agents were used as controls.

| Compound | Number of germinated peas, per cent Active agent per kg seed | | |
|---|---|---|---|
| | 0.2 g | 0.3 g | 0.4 g |
| O-γ-Dimethylaminopropyl-S-propyl thiocarbonate hydrochloride | 80% | 84% | 92% |
| Control | | | |
| 5-ethoxy-3-trichloromethyl-1,2,4-thiadiazole | 8% | 14% | 20% |
| N-Trichloromethylthio-cyclohexene-1,2-dicarboximide | 24% | 26% | 36% |
| Steamed soil, untreated seeds | 96% | 96% | 98% |
| Infested soil, untreated seeds | 0% | 0% | 0% |

EXAMPLE 3

Clay dishes having a soil capacity of 2 liters were filled with compost soil that had not been steamed. The compositions were spread per 20 cm of furrow in the form of a powder containing 10 percent of the active agent. There followed the seeding of 30 seeds per concentration of cotton seeds from which lint had been removed. The number of germinated healthy cotton seeds and the weight of the fresh plants after a cultivation period of 14 days at a temperature of 22–25°C are listed below. As a control, N-trichloro-methylthio-4-cyclohexene-1,2-dicarboximide was employed.

| Compound | mg active agent per 20 cm furrow | Number of healthy plants | Weight of fresh plants, g |
|---|---|---|---|
| O-γ-Dimethylaminopropyl-S-propyl thiocarbonate hydrochloride | 5 mg | 27 | 18 g |
| | 10 mg | 27 | 20 g |
| | 20 mg | 27 | 18 g |
| | 40 mg | 28 | 19 g |
| O-γ-Dimethylaminopropyl-S-ethyl thiocarbonate hydrochloride | 5 mg | 21 | 15 g |
| | 10 mg | 24 | 19 g |
| | 20 mg | 28 | 22 g |
| | 40 mg | 28 | 22 g |
| Control | | | |
| N-Trichloromethylthio-4-cyclohexene-1,2-dicarboximide | 5 mg | 9 | 6 g |
| | 10 mg | 18 | 12 g |
| | 20 mg | 12 | 9 g |
| | 40 mg | 16 | 10 g |
| Steamed soil | — | 30 | 22 g |
| | — | 29 | 19 g |
| | — | 30 | 20 g |
| Untreated soil | — | 0 | — |
| | — | 1 | — |
| | — | 2 | 1 g |

What is claimed is:
1. Compounds of the formula

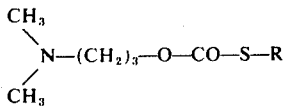

wherein R is the radical of a saturated aliphatic hydrocarbon having from two to three carbons, and their hydrochloric acid salts.

* * * * *